June 24, 1930.  R. N. FALGE  1,768,354
REAR VIEW MIRROR
Filed April 30, 1928    2 Sheets-Sheet 1
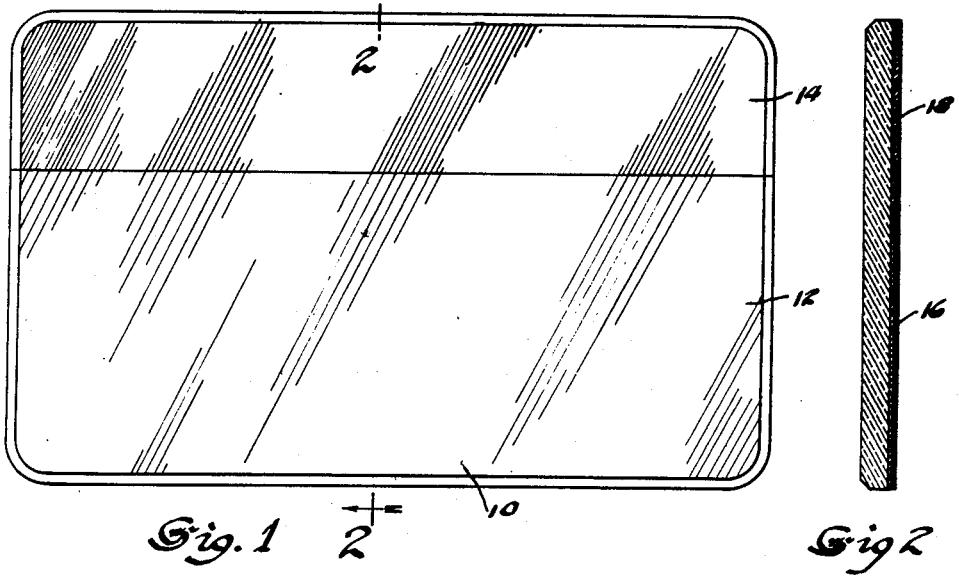
Fig. 1  Fig. 2
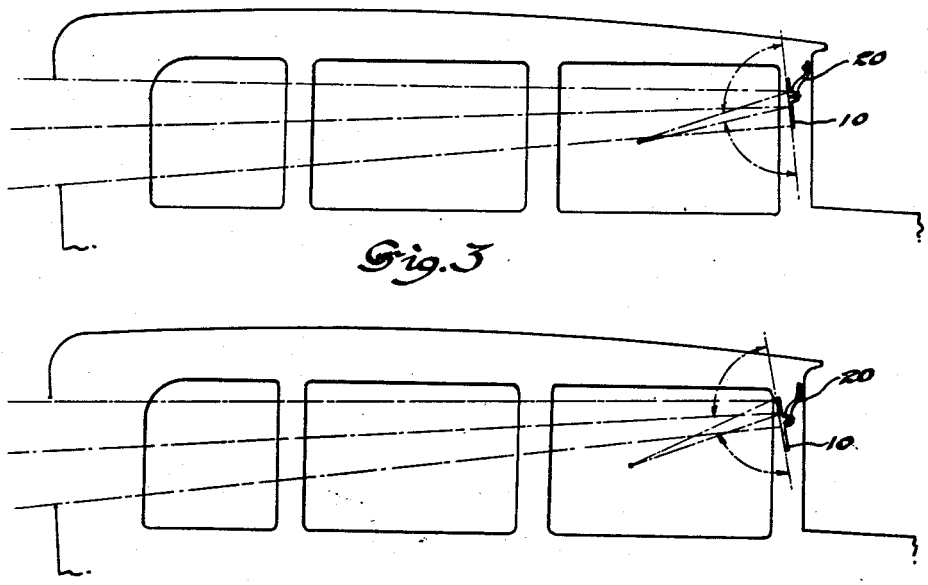
Fig. 3
Fig. 4
Inventor
Robert N. Falge
By Blackmore, Spencer & Hulse
Attorneys June 24, 1930.  R. N. FALGE  1,768,354
REAR VIEW MIRROR
Filed April 30, 1928    2 Sheets-Sheet 2
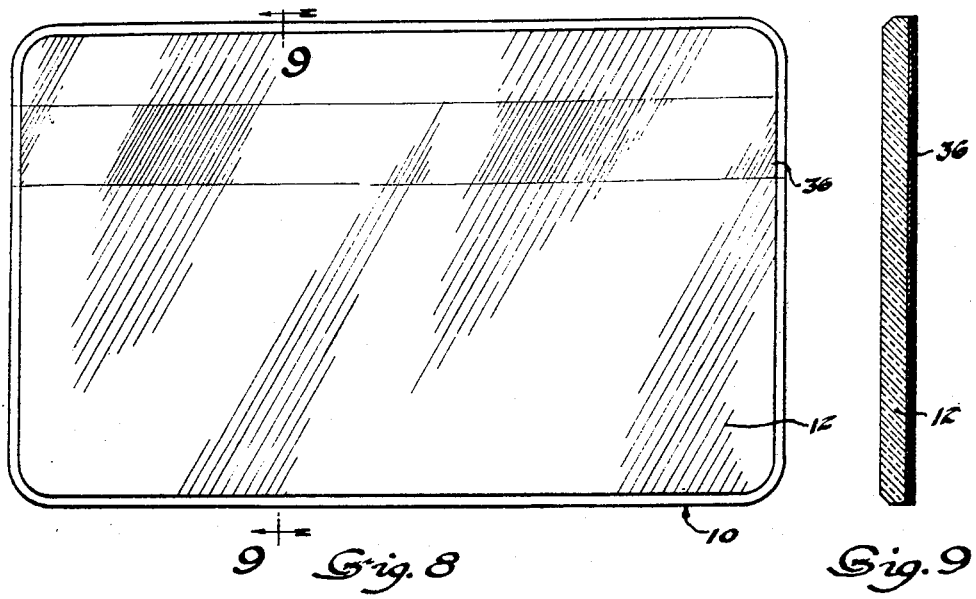
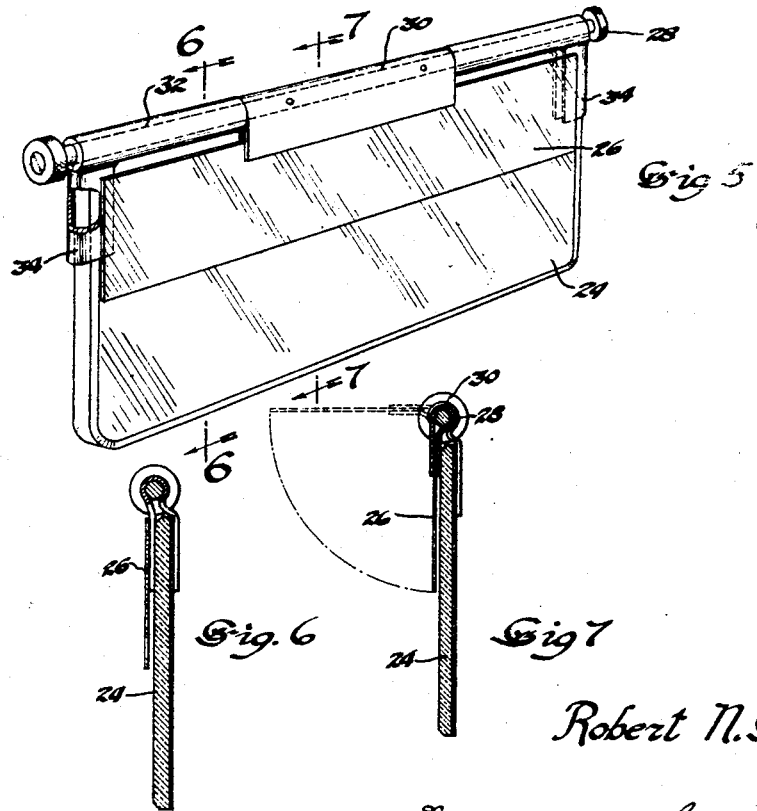
Inventor
Robert N. Falge
By Blackmore, Spencer & Flint
Attorney Patented June 24, 1930

1,768,354

UNITED STATES PATENT OFFICE

ROBERT N. FALGE, OF DETROIT, MICHIGAN, ASSIGNOR TO GENERAL MOTORS CORPORATION, OF DETROIT, MICHIGAN, A CORPORATION OF DELAWARE

REAR-VIEW MIRROR

Application filed April 30, 1928. Serial No. 274,076.

This invention has to do with rear vision mirrors for automobiles. One of the most serious difficulties met with in the use of such mirrors, as ordinarily constructed, is the glare produced by the reflection into the eyes of the driver of rays from the head lamps of vehicles to the rear. If the lamps from which the rays emanate are somewhat out of focus or improperly aimed, the resulting glare becomes particularly annoying and frequently compels the driver to adjust either the mirror or his own position to render the mirror temporarily inoperative for rear view purposes.

I have found that the most objectionable rays from headlights of following cars are not usually thrown at any great angle above the horizontal and therefore the car must be some distance to the rear before the objectionable rays strike the mirror at such angle as to cause glare in the eyes of the driver. When the car is some distance to the rear the light from its headlamps is reflected from the upper portion only of the mirror. Accordingly I propose to employ a mirror having the lower portion of high reflecting power and the upper portion of low reflecting power so that the objectionable rays which, for the most part, strike the upper portion of the mirror, will be reflected with diminished intensity, avoiding glare. This design however, possesses the disadvantage that the corresponding part of the road is rendered less visible at all times. I may overcome this disadvantage by employing a mirror of greater than the ordinary depth having approximately the lower two-thirds of its surface of high reflecting power and the upper one-third of low reflecting power. In the daytime the mirror is tilted upwardly so that the lower two-thirds is in service and this area is sufficient to give a view of the entire strip of road visible through the rear window of the car. At night the mirror is tilted downwardly so that the upper two-thirds is in use and of this the lower one-half, being of high reflecting power, gives maximum visibility to the portion of the road immediately to the rear, and the upper one-half, being of low reflecting power gives a lesser degree of visibility to the road at some distance to the rear but reduces glare materially. By this arrangement I do away with objectionable glare at night without reducing the daytime visibility.

It will of course be understood that occasionally the head lamps of vehicles are so badly out of focus or poorly aimed that although very close behind they produce bad glare. In such event, assuming the mirror in the night-driving position, it will be necessary for the driver to move his head forwardly a few inches so that only the upper one-third of the mirror is in service and from this portion rays of objectionably high intensity can not be reflected. On the other hand, should the driver desire to get the best possible view of the road at the rear it is only necessary for him to move his head rearwardly a few inches when he will have the benefit of the lower two-thirds of the mirror which possesses high reflecting power.

Several modifications of the inventive idea will be described in the course of the following specification.

Figure 1 is a front elevation of my improved mirror.

Figure 2 is a section on line 2—2 of Figure 1.

Figure 3 is a diagrammatic view showing the mirror adjusted for daytime driving.

Figure 4 is a similar view showing the mirror adjusted for night driving.

Figure 5 is a perspective view of a modified form of my device, and

Figures 6 and 7 are sections on lines 6—6 and 7—7 of Figure 5.

Figure 8 is a front view showing a further modification.

Figure 9 is a section on line 9—9 of Figure 8.

The ordinary rear vision mirror is of a size such that it will afford the driver a view of all of the road visible through the rear window of the car. My improved mirror shown at 10 in Figure 1 is of the same length as the ordinary rear vision mirror and may be of the same height but I prefer to make it half again as high. The lower two-thirds of the mirror indicated at 12 is provided with a reflecting surface of high efficiency and the upper one-third, numbered 14, is provided with a reflecting surface of low efficiency. Obviously the reflecting surface may be made in any of the known ways.

I have illustrated a mirror made of plate glass to the back of which the reflecting surfaces are applied thus the portion 12 of the mirror may be silvered at the back as shown at 16, and the entire back of the mirror, including the silvered portion, may be given a coating 18 of black enamel, this providing the reflecting surface for the upper portion of the mirror.

In Figures 3 and 4 I have indicated my mirror mounted, in the usual manner, on a bracket 20 permitting tilting about a horizontal axis. For daytime service the mirror is tilted to the position shown in Figure 3 in which the lower two-thirds of the mirror is in service and affords a view of the entire stretch of road visible through the rear window of the car. When thus adjusted it functions the same as the ordinary rear vision mirror. For night driving the mirror is adjusted to the position shown in Figure 4 in which the upper two-thirds is in service giving a view of the same stretch of road. In this position the top half of the part in service reflects light from the road at some distance to the rear of the vehicle and it is from this area that most of the glaring rays are projected as explained above. Owing to the low efficiency of this portion of the reflector the rays reaching the driver's eyes are of such low intensity as not to cause objectionable glare. The bottom half of the part of the mirror that is in service gives the usual clear view of the road immediately to the rear. As but few headlamps are so poorly adjusted as to cause glare when occupying a position so near the car, this portion of the reflector may be of high efficiency. Should there be a car behind projecting glaring rays at an unusually high angle above the horizontal so that the bottom part of the mirror does reflect glaring rays, it is but necessary for the driver to lean forward slightly so that only the upper darkened portion of the mirror is in service. Should the driver desire the best possible view of the road to the rear it is but necessary for him to move his head backwardly a few inches whereupon the portion of the mirror of high efficiency comes into play giving maximum visibility.

Instead of using a mirror higher than ordinary I may use one of the usual height and provide the upper portion with a reflecting surface of low efficiency. This portion may be one-half or less as may be preferred. The disadvantage of this arrangement is that the view of a part of the road is at all times somewhat impaired.

Instead of using a reflecting surface of low efficiency for the upper part of the mirror I may use the ordinary type mirror having high reflecting efficiency at all points and may provide a translucent screen or filter over the upper portion to reduce the intensity of the rays. This may take the form shown in Figures 5 to 7 in which 24 indicates a rear view mirror of ordinary construction having high reflecting efficiency, while 26 represents a screen of translucent material, such as celluloid or pyralin, colored green or amber or some other shade which will effect a reduction in the intensity of the rays projected upon the mirror and reflected by it. The shield 26 may be adjustably mounted as by securing it to a pivoted rod 28 by means of a pintle strip 30, so that it may be turned upwardly out of the line of vision when desired. This device may take the form of a readily attachable accessory, the shield being mounted on the mirror by providing sleeves 32 on the rod 28, the sleeves being equipped with downwardly extending channels 34 between which the edges of the mirror are gripped. The sleeves 32 preferably frictionally grip the rod so as to hold it in any desired position of adjustment.

In Figures 8 and 9 I have shown a mirror 10 which, like that shown in Figure 1, is half again as high as the ordinary rear vision mirror and in which the portion of low reflecting power, numbered 36, is confined to the lower half of the upper one-third of the mirror, for it is from the corresponding portion of the road that the majority of the glaring rays are received. Obviously the same idea may be applied to a rear vision mirror of ordinary size and in this case the lower half of the upper half of the mirror is made of low reflecting efficiency. The reduction in reflecting efficiency may of course be accomplished by the use of a shield as in Figure 5, instead of a darkened reflecting surface.

In the claims my improved rear vision mirror is described as possessing portions of high reflecting efficiency and portions of low reflecting efficiency. It is to be understood that this language, for want of better, is of a breadth to cover both forms of the invention for obviously the glare shield of Figures 5 and 6 cuts down the overall reflecting efficiency of the mirror just as truly as does the employment of less efficient reflecting surfaces.

I claim:

1. A one piece uniplanar rear vision mirror provided with an upper zone of low reflecting efficiency and a lower zone of high reflecting efficiency.

2. A rear vision mirror comprising an upper zone having a light reflecting surface of low efficiency and a lower portion having a light reflecting surface of high efficiency, said reflecting surfaces lying in substantially the same plane.

3. A rear vision mirror for automobiles of greater width than required to disclose the road visible to the rear of the driver, the lower zone of said mirror being of high reflecting efficiency and being of sufficient width to disclose a view of the entire strip of road visible to the rear, and the upper zone of said mirror being of low reflecting efficiency.

4. A rear vision mirror provided with an upper zone of low reflecting efficiency and a lower zone of high reflecting efficiency, said first named zone being of approximately half the width of said second-named zone.

5. A substantially uniplanar rear vision mirror for use in automobiles and the like provided with an upper zone of low reflecting efficiency and a lower zone of high reflecting efficiency, and means for mounting the mirror so as to permit shifting thereof to bring said upper zone in the line of vision.

6. A rear vision mirror for use in automobiles and the like having its reflecting surfaces lying in substantially a single plane, said mirror being provided with an upper zone of low reflecting efficiency and a lower zone of high reflecting efficiency, and means for mounting the mirror for adjustment about a horizontal axis to bring one or the other of said zones into the line of vision.

7. A rear vision mirror for use in automobiles and the like having its reflecting surfaces lying in substantially a single plane, said mirror being provided with zones of high reflecting efficiency and of low reflecting efficiency arranged one above the other.

8. A rear vision mirror for use in automobiles and the like having its reflecting surfaces lying in substantially a single plane, said mirror being provided with zones of high reflecting efficiency and of low reflecting efficiency arranged one above the other, and means for adjustably mounting the mirror so as to bring one or the other of said zones in the line of vision.

9. A rear vision mirror for automobiles of greater width than required to disclose the road visible to the rear of the driver comprising a zone of high reflecting efficiency of sufficient width to disclose a view of the entire strip of road visible to the rear, and a zone of lower reflecting efficiency, said zones being arranged one above the other and in substantially the same plane.

In testimony whereof I affix my signature.

ROBERT N. FALGE.